April 22, 1952

W. F. ALLER 2,593,957

FLUID LEAKAGE GAUGING DEVICE

Filed Feb. 3, 1947

INVENTOR
W. F. Aller
BY Edward J. Noel
ATTORNEY

April 22, 1952

W. F. ALLER 2,593,957

FLUID LEAKAGE GAUGING DEVICE

Filed Feb. 3, 1947

INVENTOR
W. F. Aller
BY
Edward T. Noji
ATTORNEY

Patented Apr. 22, 1952

2,593,957

UNITED STATES PATENT OFFICE 2,593,957

FLUID LEAKAGE GAUGING DEVICE

Willis Fay Aller, Dayton, Ohio, assignor to The Sheffield Corporation, Dayton, Ohio, a corporation of Ohio Application February 3, 1947, Serial No. 726,059

15 Claims. (Cl. 73—37.5)

This invention relates to gauging devices for measuring or comparing dimensions, the present application being a continuation-in-part of my prior application, Serial No. 572,139, filed January 10, 1945, now abandoned.

One object of the invention is the provision of a gauging device employing fluid flow through a leakage path for determining a dimension of the work and including a flow tube having indicating means that shows the rate of flow of fluid, the fluid system incorporating a relief valve for discharging a part of the fluid passing through the flow tube and a bypass connected around the tube and the relief valve so that adjustments of the bypass and the relief valve provide changes in the amplification factor for any predetermined range of movement of the indicating means and any constant pressure value of the fluid supplied to the flow tube.

Another object is the provision of a gauging device employing fluid flow through a leakage path for determining a dimension of the work and incorporating an adjustable relief valve for discharging a part of the fluid flowing through a rate of flow indicator, and a bypass around the conduit and the relief valve, the bypass and the relief valve being readily adjustable from the exterior of the gauging device.

Another object is the provision of a gauging device providing fluid flow through a leakage path for determining a dimension of the work and having a plurality of adjustable devices by which the amplification factor of a rate of flow indicator can be readily changed so that the full scale of the indicator can be used with different amplificattion factors at a desired pressure of the air supply for different work size differentials.

Another object is the provision of a gauging device which employs fluid flow through a leakage path for determining a dimension of the work, and including a transparent upright tube of tapered cross-section having an indicator operable along the tube to show rate of flow, the gauging device being arranged so that its several essential parts may be readily assembled on or disassembled from a readily removable plate or wall of a main housing.

Another object is the provision of a gauging device having a pressure regulator and an air filter casing carried by a readily removable back plate with the filter casing forming a support for the lower end of the flow tube.

Another object is the provision of a gauging device of the character mentioned in which the scale strip is carried for convenient removal.

Another object is the provision of a gauging device of the character mentioned, provided with an air filter employed in the fluid supply system between the lower end of a tapered flow tube and a pressure regulator which affords constant fluid pressure under varying conditions of air flow.

Other objects and advantages of the invention will be apparent from the following description, the appended claims and the accompanying drawing, in which:

Figures 1, 2:
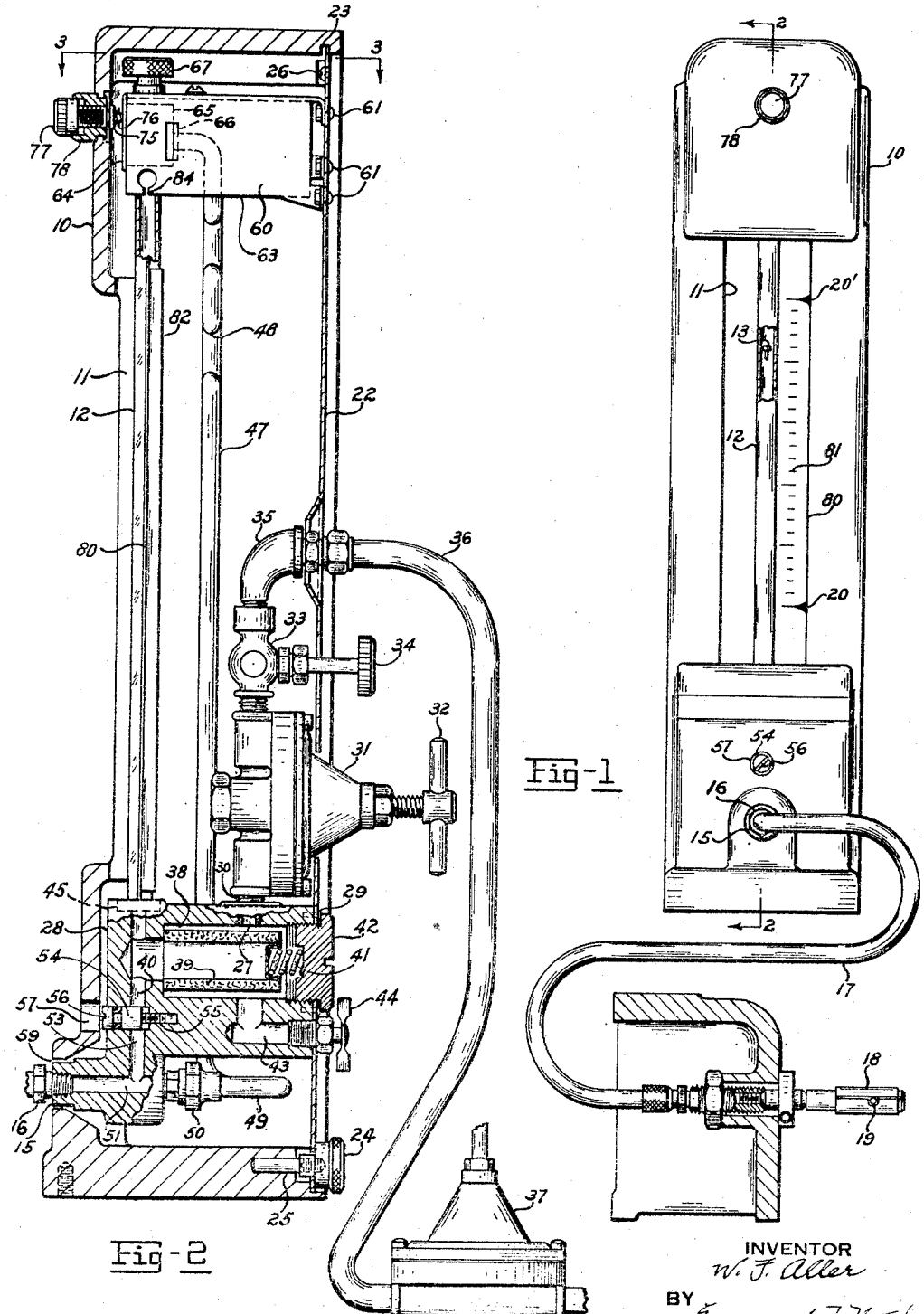
Fig. 1 is a front elevation of a gauging device embodying the present invention, the support or carrier for the work engaging element being shown in section.
Fig. 2 is a central vertical section through the gauging device taken along the line 2—2 of Fig. 1.

Referring more particularly to the drawing, in which the same reference numerals are applied to like parts in the several views, the gauging device has a suitable housing structure 10 having a front opening 11 in the front wall through which one can view an upright flow tube 12 containing a gravity operated float 13. The passage through the tube 12 is tapered so that it is slightly larger at its upper end than at its lower end, as more particularly explained in Patent 2,254,259, granted September 2, 1941. The height to which the float 13 rises in the tube indicates or measures the rate of flow through the tube.

The lower end of the tube is supplied with fluid such as air under controlled constant pressure, and the upper end of the tube is connected without any substantial restrictions in the line to an outlet passage in a projection or connection member 15 which is threaded for connection to a coupling 16 on a flexible tube 17 that extends to a work engaging element 18. As shown in Fig. 1, the work engaging element is adapted to enter a hole in a workpiece, but obviously it may take any one of many forms. In the form shown, it is adapted to measure the diameter of an object. A passage arranged axially in the work engaging element communicates with one or more gauging orifices 19, it being understood that the amount of air leakage taking place between the orifice and the work is in accordance with the diameter of the workpiece. The rate of flow through the gauging orifices is indicated by the level of the float 13 previously mentioned, and by comparing the height to which the float rises with the indication produced when a part of exact or known size is gauged, it may be readily determined whether the workpiece is within the required tolerance dimensions. Adjustable pointers are preferably positioned at the lower and upper tolerance limits for any particular gauging operation as shown at 20 and 20'.

Arranged along the rear of the housing 10 is a readily removable back plate 22. It is held firmly in place on the housing by suitable means so it can be conveniently separated from the rear wall of the housing and it carries the principal parts of the gauging device as will be described. Securing screws may be used to fasten the back plate in a removable manner although, as here shown, the upper part of the back plate fits into a groove 23 in the housing while its lower end is held rigidly by a connection knob 24 having a stem threaded on a stud 25 in the housing, the stem of the knob passing through a hole in the back plate as shown in Fig. 2. Leaf springs 26 secured to the upper portion of the back plate hold the latter firmly against one side of the groove 23.

Fixed to the lower portion of the plate 22 is a support or block 28 which, in the preferred form of the invention, as shown, forms the casing or housing of an air filter as well as incorporating a number of the passages in the system. Screws 29 hold this air filter housing on the back plate. Mounted on the filter housing, by means of a threaded nipple 30, is a pressure regulating valve 31 having a portion extending through a hole in the back plate and supporting an adjusting handle 32 by means of which the discharge pressure of the regulator can be controlled from the back of the instrument. Carried by the pressure regulator valve is a shut-off valve 33 operated by control knob 34 at the back of the instrument. Fluid is supplied to the shut-off valve by pipe 35 connected to a supply tube or hose 36 which extends to a pressure regulator 37, preferably employed between the instrument and the factory air line. The pressure regulator 37 may be set to supply air at a somewhat higher pressure than the setting of the regulator valve 31 so that surges in the factory line will be damped and an exact, even discharge pressure obtained from the regulator 31.

Air is thus supplied at constant pressure through the opening 27 to the filter chamber 38 having a filter pad 39 interposed between the passage 40 and the passage 27. Spring 41 interposed between the filter pad and a cover or cap screw 42 holds the filter in place, the cap screw being removable for access to and replacement of the filter pad. Liquid and sediment collected from the filter chamber travel down through collecting passage 43 and can be occasionally discharged by removing the closure plug 44.

Figure 5:
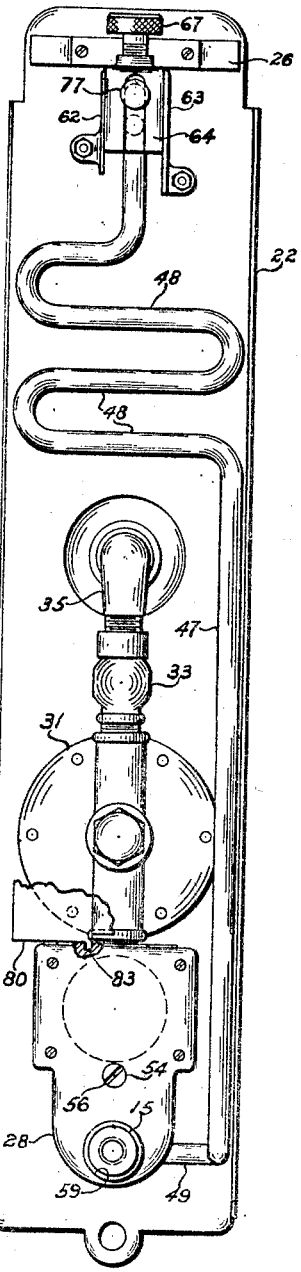
Fig. 5 is an elevation of the back plate viewed from the front of the housing but with the flow tube and scale removed.

The filtered air supplied to passage 40 flows upwardly through the tapered transparent flow tube 12 the lower end of which rests against a packing or sealing ring 45 contained in a seat in the filter housing. The connections at the upper end of the flow tube will be presently described. However, air that has traveled up through the flow tube returns through a flexible pipe 47, preferably a copper pipe having turns 48 as shown in Fig. 5 so that the distance between the top and bottom of this tube can be changed. The lower end of this tube, as shown at 49 in Fig. 2, is connected by coupling 50 in communication with a passage 51 in the filter housing. Air from this passage travels out through the projection or connection member 15 and then through the flexible tube 17 to the gauging element 18 and is discharged through the orifices 19, the rate of discharge or leaking taking place at the work being controlled by the size of the work as previously set forth.

Some of the air supplied to the passage 40, instead of going up through the flow tube 12, is bypassed through the bypass channel 53 directly to the passage 51. An adjustable bypass valve controls the amount of flow taking place through this channel 53. This valve, as shown, comprises a valve plug 54 having a stem 55 threaded in the filter housing. A screw driver slot 56 in the head of this plug is accessible from the front of the housing through an opening 57 so that the plug can be readily turned to extend a desired distance into the channel 53 and block off the channel completely or permit the passage of the desired amount of air. The short circuiting of a portion of the air supplied to the gauging nozzles, so that portion does not flow through the flow tube, permits wide variations in the amount of air flow taking place at the gauging nozzles while maintaining the float 13 between the upper and lower limits of its travel in the tube. However, since the relationship of air flow through the tube and through the bypass channel 53 is kept in proportion at any particular setting of the bypass valve, a true indication of the total flow out through the gauging nozzles is given by the float.

As will be apparent from Fig. 2, the connection member 15 forms a part of or is carried by the filter housing and extends through a hole 59 in front of the housing so that when the coupling 16 is removed and the screws that hold the back plate on the housing are taken off, the back plate and its supported parts can be readily taken from the main housing, without disturbing the various connections between the pressure regulator, the filter, the bypass and the flow tube.

Figure 4:
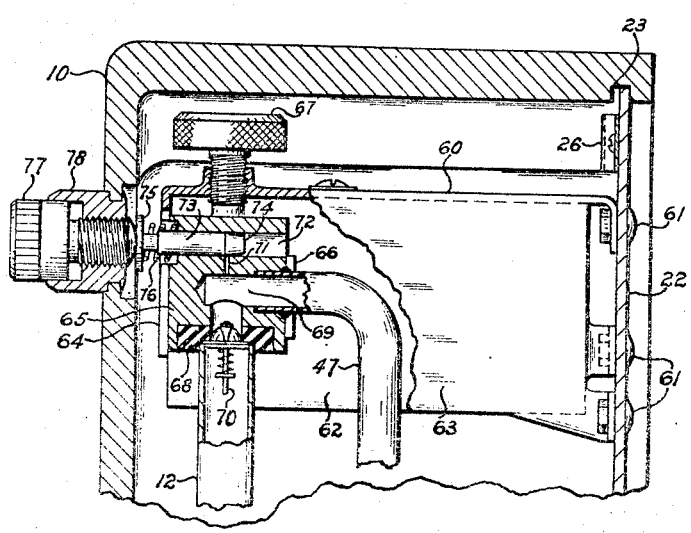
Fig. 4 is a central vertical section on an enlarged scale, through the upper portion of the instrument.

A frame 60, preferably of sheet metal, is fastened as by means of screws 61 to the upper portion of the back plate, as shown in Figs. 2 and 4. The side walls 62 and 63 and the end wall 64 form guides for a connection block 65. The side walls 62 and 63 are also provided with inturned ears 66 that also guide the block 65 so that the latter can be moved upwardly or downwardly. A thumb screw 67 threaded in the horizontal upper wall of the frame 60 bears against the top of the block 65 and by turning this thumb screw the block can be depressed and clamped down on the upper end of the flow tube 12. A packing ring 68 is arranged in a recess in the lower side of the block 65 and engages the wall of the tube 12 to prevent leakage. When the thumb screw 67 is released, the block 65 is moved upwardly by the tension in the copper pipe 48, which is of such length as to tend to separate the block 65 from the upper end of the flow tube. Thus by turning the thumb screw 67 the block 65 can travel up far enough so that the flow tube can be removed. The block 65 has a passage 69 in communication with the pipe 48, the end of which has a fluidtight connection to the block as shown in Fig. 4. A float bumper 70 is also shown in this figure, arranged in the top of the tube 12 for gradually absorbing the impact of the float when the latter is driven upwardly by the air upon removal of the work.

The passage 69 in the block 65 communicates through a channel 71 with a relief passage 72 which is open to the atmosphere. A valve stem 73 having a tapered throttle end 74 can be axially adjusted in the passage 72 so as to permit any desired amount of leakage or entirely prevent leakage, out through the channel 71. A flanged stud 75 is fixed on the end of the stem 73 and a spring 76 engaging the flange on this stud tends to yieldingly move the stud 73 towards the left, as viewed in Fig. 4, to open the relief passage 71. The flanged end of the valve is engaged by an adjustable thumb screw 77 threaded in a holder 78 on the front of the housing so that the position of the relief valve can be readily controlled from the front of the housing and permit more or less of the air flowing through the tube 12 to be relieved to atmosphere instead of returning down through the flexible tube 48 and out through the gauging nozzle. By controlling the position of the relief valve 73 in conjunction with the position of the bypass valve 54 previously described, the desired adjustment of the amplification factor of the instrument can readily be made. This will be explained more fully.

The connection between the thumb screw 77 and the relief valve 73, and the attachment between the block 65 and the upper end of the tube and the flexible pipe 48 are such that the back plate can be removed from the housing without disturbing any of these connections. The back plate 22 together with all the parts it supports can thus be disassociated from the housing as a unit, and after the back plate has been swung out of the housing the thumb screw 67 can be turned to permit removal of the tube for replacing the tube or the sealing rings.

Figure 3:
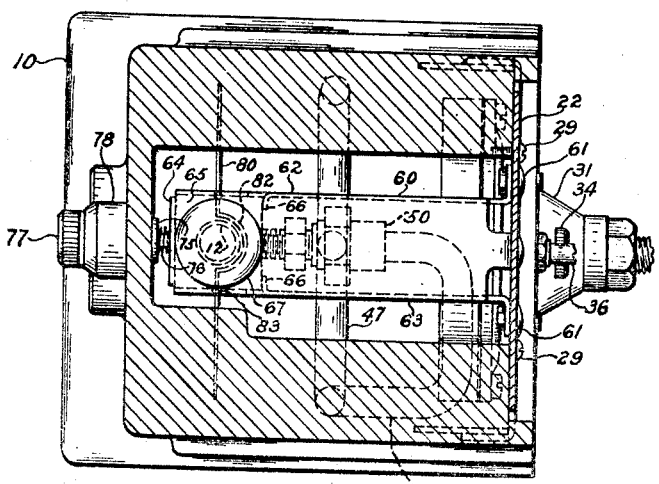
Fig. 3 is a horizontal section on the line 3—3 of Fig. 2.

Arranged in back of the opening 11 of the front wall of the gauge housing is a scale strip 80 having suitable graduations 81. As shown at 82 in Fig. 2, and in Fig. 3, the central portion of this strip extends around back of the tube 12 and wing portions extend up along each side of the tube. The lower end of the strip has projecting tongues extending down in locating sockets 83 in the filter housing. The upper end of the scale strip extends up through slots 84 in the side walls 62 and 63 of frame 60, as shown in Fig. 2, the slots 84 being of sufficient length that the scale strip can be raised to free the tongues from the sockets 83 in the filter housing so that after the tube is removed from the filter housing, the scale plate can also be taken off forwardly. The adjustable pointers 20 are arranged on the scale strip so they can be moved up or down by hand from the front of the housing and set to the float positions when the two standards or masters, representing the maximum and minimum permissible size, are engaged by the work engaging element or spindle 18.

The application of the filter in the fluid supply system between the pressure regulating valve 31 and the flow tube 12 provides for the condensation and collection of moisture caused by the reduction in pressure that takes place as the air flows from the pressure regulating valve. Thus the air flowing through the tube will be free from moisture. It is very desirable to have the filter arranged on the low pressure side of the pressure regulator since the presence of moisture in the tube under some conditions will produce an erratic operation of the float 13 which has a tendency to cling to the top of the tube or the wall of the tube if such moisture is present.

The amount of taper present in the flow tube, the pressure used, and the clearance between the ends of the gauging nozzles 19 and the work are the principal features that determine the amplification factor of the gauging instrument, and of course these various factors may be selected to meet required conditions. The surfaces of the gauging nozzles 19 are slightly depressed below the surfaces of the work engaging element 18 and there is some slight clearance between the surfaces of the gauging element 18 and the work or the master as the case may be. During use some slight wear takes place on the surface of the gauging element 18 and there is also wear on the surfaces of the gauging nozzle itself. Over a considerable period of use even though other conditions including the pressure regulator setting all remain the same, there is a gradual loss in the amplification factor of the gauge for any particular work engaging element due to the wear mentioned. It is thus desirable to vary the amplification factor of the gauge in order to compensate for the wear on the gauging element. Furthermore, different conditions of use require different amplification factors for the same or different work engaging elements, since the tolerance on one job may be plus or minus one thousandth of an inch and the tolerance on another job of similar size may be plus or minus five ten-thousandths of an inch for example. In changing the amplification factor of the gauge it is, of course, extremely desirable that the same scale plate be used and that the same range of movement of the float between desired upper and lower limiting positions in the tube should take place so that full scale readings are obtainable. The adjustable bypass and the adjustable relief valve permit this adjustment of amplification in a practical manner and provide for use under widely varying conditions and tolerance requirements. Furthermore, the amplification adjustment permits the scale indications or graduations to be predetermined and predesigned instead of being calibrated for any particular gauging element. A further explanation of this follows.

Assuming that the bypass valve only partially closes the bypass 53 and assuming the relief valve 73 only partially closes passage through relief channel 71, then part of the air supplied through the pressure regulator valve goes up through the flow tube and is effective on the float, most of this air then returning through pipe 47 and passing out through the gauging nozzles in the gauging element 18. Part of the air flowing through the flow tube is discharged to atmosphere through relief passage 71, but this air flow is the same for any setting of the relief valve since the pressure of the air supplied to the tube is constant. Part of the air supplied from the filter is bypassed to the gauging element and does not affect the level of float 13, as the flow through the flow tube 12 has a constant ratio to the flow through the bypass for any setting of the bypass and pressure regulator, the readings of the float level will properly compare the entire flow through the gauging element when the work is engaged, with the flow existant when the masters are engaged. Assuming under these conditions that with an air pressure supply to the flow tube of, for example, 16 pounds per square inch, a master having a hole exactly 1.0000" is applied to the element 18, and the flow through the gauging system is such as to carry the float up to the pointer 20 located near the bottom of the tube and the scale and in line with one of the main scale divisions. Assuming also that merely by removing this master and applying a master having a hole 1.0001″ diameter to the element 18, the float is raised so as to be just even with the pointer 20′ near the upper end of the scale. This is for some particular work that has a tolerance of plus one ten-thousandth of an inch and a minus zero tolerance, the normal work size being one inch. When the workpiece is applied to the standard the float level shows, if it is between the pointers 20 and 20′, that the work is acceptable.

Now assume that over a period of time there is wear on the element 18 or on the nozzles 19 and more leakage takes place through the nozzles for those same masters. The upper and lower float levels for those same masters have thus been raised. This increased height to which the float rises, however, is not the same adjacent the two pointers 20 and 20′, for the amplification factor of the instrument has also been changed due to the wear of the gauging element 18. Where normally say a five inch movement of the float along the tube 12 between pointers 20 and 20′ might have indicated a difference of one ten-thousandth of an inch in the masters, or the work, now after the wear on the element 18 the movement of the float between 20 and 20′ might indicate six ten-thousandths of an inch. In other words, the amplification factor has been reduced. This was also accompanied by a rise in the float level when the same maximum and minimum masters are applied, since more air passes through the flow tube than under the starting conditions. To lower the float level in the tube without substantially affecting its amplification, the relief valve 73 is moved to further restrict the leakage of air through this valve, thus causing less air to pass up through the flow tube. This may drop the float, when the smaller size master is used, back to the original position opposite pointer 20, but the float when the larger size master is used would be below the pointer 20′ due to the decrease in the amplification factor caused by the wear in the gauging element. Then by adjusting the bypass valve 56 to reduce the amount of air short circuited around the flow tube and put more air through the flow tube, the amplification factor is increased, but due to the increased air flow through the tube, the float level will be raised again. However, by properly adjusting both the bypass and the relief valve the amplification factor can be made whatever is desired and the normal upper and lower positions of the float can be kept constant so that the full range of the scale can be used in a gauging operation.

In a similar manner by adjusting the bypass valve and the relief valve, the amplification can be very considerably increased or decreased as desired so that the normal full range movement of the float can be used to show a size difference of five ten-thousandths of an inch or one thousandth of an inch or any other desired value according to required conditions. Since adjustment of the relief valve has no substantial effect on the amplification value and since adjustment of the relief valve changes the normal float level without changing the amplification factor, it will be obvious that for any given pressure or supply from the pressure regulator 31 it requires the conjoint operation of both the bypass and the relief valves to keep the normal full scale range at the different amplifications required or desired. A change in pressure by adjusting the handle 32 of the pressure regulating valve has only a small effect on amplification and it is not entirely practical to attempt to adjust amplification merely by adjusting the air pressure supply, since a substantial flow of air is required at the gauging nozzle to obtain some measurable flow of air through the tube and the gauging elements 18 are therefore designed for use at some normal desired pressure of approximately from ten to twenty pounds per square inch although under some conditions values above and below these limits have proved satisfactory.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A gauging device comprising a housing having a readily removable vertical back plate providing a housing closure at the rear of said housing, a filter casing fastened to said plate near the lower end thereof, a readily releasable tube clamping means on said plate, a vertical flow tube supported between said filter casing and clamping means, means carried by said plate for supplying fluid under pressure to said filter casing, a connection means accessible from the exterior of the housing, and a connection from the upper end of said tube to said connection means, said flow tube having means operable therein and visible through the front of said housing to indicate the rate of flow of fluid through said tube.

2. A gauging device comprising a housing having a readily removable back plate providing a housing closure and extending upwardly at the rear of said housing, a support fastened to said plate and having a passage and having an extension projecting through an opening in the front of the housing adapted for connection to a work engaging element, a flow tube carried by said support and communicating with the support passage, means carried by an upper portion of the back plate for clamping engagement with the upper end of the flow tube, fluid pressure regulating means carried by said plate for supplying fluid under controlled pressure to said support, and a flow connection from the upper end of said flow tube to said support projection, said flow tube having means operable therein to indicate the rate of flow of fluid through the tube.

3. A gauging device comprising a housing having a readily removable back plate forming a housing closure and extending upwardly at the rear thereof, an air filter casing fastened to said plate near the lower end thereof, tube clamping means carried by said plate, a flow tube extending between said clamping means and said filter casing, fluid pressure regulating means carried by said plate for supplying fluid under controlled pressure to said filter, and a flow connection from the upper end of said tube and adapted for connection to a work engaging element, said flow tube having means operable therein to indicate the rate of flow of fluid through the tube.

4. A gauging device comprising a housing having a readily removable back plate forming a housing closure and extending upwardly at the rear of said housing, a flow tube having means operable therein to indicate the rate of flow of fluid through the tube, a supporting block carried by said plate having a fluid supply passage in communication with said flow tube and a fluid discharge passage, means attached to said supporting block for supplying air under controlled pressure to said fluid supply passage, a bypass passage in said supporting block extending from said fluid supply passage to said discharge passage, an adjustable valve for said bypass passage, means for adjusting said valve and a connection from said discharge passage to the upper end of the flow tube.

5. A gauging device comprising a housing having a viewing opening in an upstanding wall thereof, an outlet opening in said housing, a readily removable plate extending upwardly to the rear of said wall, a filter casing on said plate, a filter in said casing, tube clamping means on said plate, a flow tube between said filter casing and clamping means and having its lower end communicating with said filter casing, a scale strip extending along said tube in position to be viewed through said viewing opening, the upper and lower ends of said strip having locating engagement with said clamping means and filter casing, said filter casing having a projection forming a discharge passage and extending through said outlet opening in the housing, means carried by said plate for supplying fluid under controlled pressure to said filter casing and a fluid connection from upper end of said tube to the passage in said projection.

6. A gauging device of the character described comprising a transparent tube having a passage of tapering cross sectional area, a casing containing an air filter and supporting the lower end of said tube, gravity actuated indicating means operable along said tube by a flow of fluid through the tube, fluid supply means extending from the upper end of said tube and adapted for connection to a gauging element, a pressure regulator adapted for connection to a fluid pressure source and having a discharge passage in which a constant pressure is maintained under varying conditions of rate of flow, said filter being interposed between the pressure regulator discharge and the lower end of said tube, a scale strip of material extending along said tube and supported at its lower end on said filter casing, and clamping means on said housing for releasably holding the upper end of said tube to permit convenient removal thereof.

7. A gauging device of the character described comprising a transparent tube having a passage of tapering cross sectional area, a casing containing an air filter supporting the lower end of said tube, said filter casing having connection means adapted for connection to a work engaging element, gravity actuated indicating means operable along said tube by a flow of fluid through the tube, fluid supply means extending from the upper end of said tube to said connection means, a pressure regulator adapted for connection to a fluid pressure source and having a discharge passage in which a constant pressure is maintained under varying conditions of rate of flow, said filter being interposed between the pressure regulator discharge and the lower end of said tube, and means for releasably holding the upper end of said tube.

8. A gauging device comprising a housing having an upstanding front wall provided with a viewing opening, an outlet opening in said housing, a readily removable plate providing a closure wall for said housing, a filter casing mounted on said plate and having a projecting portion extending through said outlet opening in the housing, a readily releasable tube clamping means on said plate, a flow tube supported between said filter casing and said clamping means and having its lower end communicating with the discharge side of said filter casing, a scale plate extending along opposite sides of said tube and held between said filter casing and said clamping means, said scale plate and said tube being visible through the viewing opening in the housing, means operable to move said clamping means for the release of said tube, means carried by said plate for supplying air at controlled pressure to said filter casing, and a fluid connection from the end of said tube to the projecting portion of said filter casing.

9. A gauging device for use with a gauging head that employs fluid flow through a leakage path to determine a characteristic of an object gauged, said device comprising a conduit having a movable flow indicator operable in accordance with the flow of fluid through the conduit, means for furnishing fluid at a regulated pressure to one end of the conduit, a relief valve connected to the other end of the conduit for discharging to atmosphere a part of the fluid passing through said conduit, manually operable means to control said relief valve for control of the positioning of the indicator, means for supplying fluid from the relief valve to a gauging head, an adjustable bypass connection extending around the conduit and relief valve and coacting therewith to change the amplification factor of the gauging device independently of adjustment of the regulated pressure of fluid supply to the conduit, and a common support for the conduit, fluid supply means, valve and bypass connection.

10. A gauging device for use with a gauging head that employs fluid flow through a leakage path to determine a characteristic of an object gauged, said device ocmprising a conduit having a movable flow indicator operable in accordance with the flow of fluid through the conduit, a support for said conduit, means for supplying fluid at a regulated pressure to one end of the conduit, an adjustable relief valve connected to the other end of the conduit for discharging to atmosphere a part of the fluid passing through said conduit, connection means carried by said support for supplying fluid from the relief valve to a gauging head, an adjustable bypass connection extending around the conduit and relief valve for changing the amplification factor of the gauging device, and means conveniently accessible from the exterior of said support for independently adjusting said relief valve and adjustable bypass connection.

11. A gauging device as set forth in claim 10, said conduit comprising an upwardly extending tapered tube and said flow indicator comprising a gravity actuated float operable within the tube, said relief valve being directly connected to the upper end of the tube.

12. A gauging device for measuring or comparing a characteristic of an object gauged such as a workpiece dimension, comprising a support, a rate of flow indicator carried by said support, a pressure regulator carried by said support for supplying air under constant pressure to said indicator, a work head through which fluid leakage takes place in accordance with a gauged characteristic, means connecting said indicator in communication with said work head, an adjustable relief valve between the work head and the rate of flow indicator, an adjustable bypass connection in communication on the one hand with a point in the fluid system between the pressure regulator and the rate of flow indicator and on the other hand with a point between the work head and the relief valve, a graduated scale cooperating with said rate of flow indicator and means accessible from the exterior of said support for independently adjusting the relief valve and the adjustable bypass connection to change the amplification factor of said indicator for any predetermined range of movement of the indicator.

13. A gauging device comprising a supporting housing, an upwardly extending conduit mounted in said housing and containing a movable gravity actuated float operable in accordance with the flow of fluid through the conduit, a scale adjacent said conduit, means in said housing for supplying fluid at a regulated pressure to the lower end of the conduit, a relief valve connected to the upper end of the conduit and arranged in said housing for discharging to the atmosphere a part of the fluid passing through said conduit, manually operable means accessible from the front of the housing for adjusting said relief valve, a gauging head adapted to provide for fluid leakage in accordance with a characteristic of an object gauged, means accessible from the exterior of the housing for connecting said gauging head to said relief valve, a connection extending around the conduit and relief valve and containing an adjustable bypass valve within the housing for changing the amplification factor of the gauging device, and means conveniently accessible from the exterior of the housing for adjusting said bypass valve.

14. A gauging device adapted for use with a work head to gauge fluid leakage to determine a characteristic of an object gauged, comprising a housing having a front wall provided with an opening, an upright conduit of tapered internal cross-section visible through said opening and having a gravity actuated float for gauging the rate of flow of fluid through the conduit, said housing having a removable wall supporting said conduit, a pressure regulator carried by said removable wall for supplying fluid under pressure to the lower end of said conduit, connection means accessible from the front of said housing but carried by said removable wall for connecting said conduit in communication with a work head, a relief valve carried by said wall between the conduit and connection means for discharging a part of the fluid passing through said conduit, means accessible at the exterior of said housing for adjusting said relief valve, a bypass connection containing an adjustable bypass valve and extending around the conduit and the relief valve, and means accessible at the exterior of said housing for adjusting said bypass valve.

15. A gauging device adapted for use with a work head to gauge fluid leakage to determine a characteristic of an object gauged, comprising a housing having a front wall provided with an opening, an upright conduit of tapered internal cross section visible through said opening and provided with a gravity actuated float for gauging the rate of flow of fluid through said conduit, a block supported by said housing and supporting the lower end of said conduit, connection means accessible from the exterior of said housing for connection to a work head, an adjustable relief valve connected to the upper end of said conduit and connected to said connection means and providing for the free discharge of a part of the fluid passing through the conduit, a bypass connection extending around the conduit and relief valve and containing an adjustable bypass valve arranged in said block, means carried by said housing for supplying air at a regulated pressure to said block for flow through said conduit and means accessible from the exterior of the housing for adjusting said bypass valve.

WILLIS FAY ALLER.

REFERENCES CITED

The following references are of record in the file of this patent:

UNITED STATES PATENTS

| Number | Name | Date |
|---|---|---|
| 1,676,673 | Stalker | July 10, 1928 |
| 1,982,528 | Mennesson | Nov. 27, 1934 |
| 2,073,243 | Liddell et al. | Mar. 9, 1937 |
| 2,139,282 | Poock et al. | Dec. 6, 1938 |
| 2,254,259 | Aller | Sept. 2, 1941 |
| 2,370,219 | Aller | Aug. 15, 1942 |
| 2,403,897 | Aller | July 16, 1946 |